(12) United States Patent
Sera et al.

(10) Patent No.: US 6,359,094 B1
(45) Date of Patent: Mar. 19, 2002

(54) STYRENE POLYMER AND MOLDED OBJECT OBTAINED BY MOLDING THE POLYMER

(75) Inventors: Masanori Sera; Hajime Shouzaki, both of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/926,272

(22) PCT Filed: Apr. 12, 2000

(86) PCT No.: PCT/JP00/02376

§ 371 Date: Oct. 4, 2001

§ 102(e) Date: Oct. 4, 2001

(87) PCT Pub. No.: WO00/61643

PCT Pub. Date: Oct. 19, 2000

(30) Foreign Application Priority Data

Apr. 14, 1999 (JP) ............................................ 11-106692

(51) Int. Cl.$^7$ ................................................ C08F 12/02
(52) U.S. Cl. ........................................ 526/346; 525/241
(58) Field of Search ............................ 526/346; 525/241

(56) References Cited

U.S. PATENT DOCUMENTS 5,260,394 A * 11/1993 Tazaki et al. ................ 526/347
6,207,753 B1 * 3/2001 Teshima et al. ......... 525/242 X

FOREIGN PATENT DOCUMENTS

EP 0 570 931 A2 * 11/1993
JP 6-107812 * 4/1994

* cited by examiner

*Primary Examiner*—Fred Teskin
(74) *Attorney, Agent, or Firm*—Oblon, Spivak, McClelland, Maier & Neustadt, P.C.

(57) ABSTRACT

Provided is a styrenic polymer having a syndiotactic structure, of which the ratio P of the angular frequency, $\omega_{3000}$ (unit: rad/sec), when its storage elastic modulus G' measured through dynamic viscoelastometry is 3000 (Pa), to the angular frequency thereof, $\omega_{30}$ (unit: rad/sec), when its storage elastic modulus G' is 30 (Pa), $P=[\omega_{3000}/\omega_{30}]$ satisfies the following formula (1):

$$P=[\omega_{3000}/\omega_{30}] \geq 25 \qquad (1).$$

The polymer has good melt flowability and improved moldability and melt tension, still having excellent mechanical strength, heat resistance and solvent resistance.

10 Claims, No Drawings

STYRENE POLYMER AND MOLDED OBJECT OBTAINED BY MOLDING THE POLYMER

TECHNICAL FIELD

The present invention relates to a styrenic polymer, more precisely to that having a syndiotactic structure, syndiotactic polystyrene having good melt flowability and improved moldability and melt tension and still having excellent mechanical strength, heat resistance and solvent resistance.

BACKGROUND ART

It has heretofore been known that a styrenic polymer having a syndiotactic structure, syndiotactic polystyrene (hereinafter referred to as SPS) has excellent mechanical strength, heat resistance and solvent resistance, and the polymer has many applications. However, since conventional SPS is produced by the use of a single-site catalyst, its molecular weight distribution is narrow and its melt tension is low. Therefore, its moldability especially in expansion molding, inflation molding or blow molding is poor, and the practical use of the polymer is often problematic.

On the other hand, Japanese Patent Laid-Open No. 119006/1991 discloses a method for producing SPS having an expanded molecular weight distribution, by the use of a catalyst comprising two or more different types of titanium compounds. This is for improving the moldability of the polymer. However, the molecular weight distribution (Mw/Mn) of the SPS products produced in Examples in the laid-open publication is 10 or more and is too broad. In addition, the number-average molecular weight (Mn) of the polymer is tens of thousands or so and is low. The polymer contains a large quantity of low-molecular-weight components, and its moldability could not be improved to the intended degree. In addition, still another problem with the polymer is that the strength of its moldings is low.

The present invention is to solve the problems noted above, and its object is to provide a styrenic polymer having a syndiotactic structure, syndiotactic polystyrene having good melt flowability and improved moldability and melt tension and still having excellent mechanical strength, heat resistance and solvent resistance.

DISCLOSURE OF THE INVENTION

We, the present inventors have assiduously studied to attain the object as above, and, as a result, have found that a syndiotactic polystyrene, of which the elastic modulus change to shear rate change satisfies a specific requirement, has good melt flowability and improved moldability and melt tension. Based on this finding, we have completed the present invention. Specifically, the invention provides a styrenic polymer mentioned below.

1. A styrenic polymer having a syndiotactic structure, of which the ratio P of the angular frequency, $\omega_{3000}$ (unit: rad/sec), when its storage elastic modulus G' measured through dynamic viscoelastometry is 3000 (Pa), to the angular frequency thereof, $\omega_{30}$ (unit: rad/sec), when its storage elastic modulus G' is 30 (Pa), P=$[\omega_{3000}/\omega_{30}]$ satisfies the following formula (1):

$$P=[\omega_{3000}/\omega_{30}] \geq 25 \tag{1}$$

2. The styrenic polymer of above 1, which satisfies the following (1) and (2):
   (1) The ratio of the weight-average molecular weight (Mw) to the number-average molecular weight (Mn) of the polymer measured through gel permeation chromatography (GPC), Mw/Mn, is at most 5;
   (2) The ratio of the Z-average molecular weight (Mz) to Mn of the polymer measured through GPC, Mz/Mn, is at least 3.5.

3. The styrenic polymer of above 1, of which the molecular weight distribution measured through GPC satisfies the following (1), (2) and (3):
   (1) The proportion of the component having a molecular weight of at most 50,000 of the polymer, $C_{50}$, falls between 1 and 30% by weight;
   (2) The proportion of the component having a molecular weight of at least 1,000,000 of the polymer, $C_{1000}$, falls between 1 and 30% by weight;
   (3) The weight-average molecular weight, Mw, of the polymer falls between 100,000 and 2,000,000.

4. The styrenic polymer of above 3, of which the proportion of the component having a molecular weight of at most 50,000, $C_{50}$, and the weight-average molecular weight, Mw, satisfy the following:

$$\log(C_{50}) \geq -1.48 \times \log(Mw/1000) + 4.44.$$

5. The styrenic polymer of above 1, of which the melt tension, MT, and the melt index, MI, satisfy the following formula (2):

$$\log(MT) \geq -0.887 \times \log(MI) + 0.654 \tag{2}$$

6. Moldings of the styrenic polymer of any of above 1 to 5.

BEST MODES OF CARRYING OUT THE INVENTION

The styrenic polymer [1] and its moldings [2] of the invention are described in detail hereinunder.

1 Styrenic Polymer

The styrenic polymer [1] of the invention has a syndiotactic structure, of which the ratio P of the angular frequency, $\omega_{3000}$ (unit: rad/sec), when its storage elastic modulus G' measured through dynamic viscoelastometry is 3000 (Pa), to the angular frequency thereof, $\omega_{30}$ (unit: rad/sec), when its storage elastic modulus G' is 30 (Pa), P=$[\omega_{3000}/\omega_{30}]$ satisfies the following formula (1):

$$P=[\omega_{3000}/\omega_{30}] \geq 25 \tag{1}$$

The styrenic polymer having a syndiotactic structure is meant to include polystyrenes, poly(alkylstyrenes), poly(halogenostyrenes), poly(halogenoalkylstyrenes), poly(alkoxystyrenes) and poly(vinyl benzoates) having a degree of racemi-diad syndiotacticity of generally at least 75%, but preferably at least 85% or having a degree of racemi-pentad syndiotacticity of generally at least 30%, but preferably at least 50%, and their hydrogenated polymers and their mixtures, or copolymers comprising, as the essential ingredient, any of them. The poly(alkylstyrenes) include poly(methylstyrenes), poly(ethylstyrenes), poly(isopropylstyrenes), poly(tert-butylstyrenes), poly(phenylstyrenes), poly(vinylnaphthalenes), poly(vinylstyrenes), etc.; and the poly(halogenostyrenes) include poly(chlorostyrenes), poly(bromostyrenes), poly(fluorostyrenes), etc. The poly(halogenoalkylstyrenes) include poly(chloromethylstyrenes), etc.; and the ply(alkoxystyrenes) include poly(methoxystyrenes), poly(ethoxystyrenes), etc.

Of those styrenic polymers, especially preferred are polystyrenes, poly(p-methylstyrenes), poly(m-methylstyrenes), poly(p-tert-butylstyrenes), poly(p-chlorostyrenes), poly(m-chlorostyrenes), poly(p-fluorostyrenes), hydrogenated polystyrenes, and copolymers containing any of these structural units.

P in formula (1) is the ratio of the angular frequency, $\omega_{3000}$ (unit: rad/sec) of the polymer, when its storage elastic modulus G' measured through dynamic viscoelastometry mentioned below is 3000 (Pa), to the angular frequency thereof, $\omega_{30}$ (unit: rad/sec), when its storage elastic modulus G' is 30 (Pa), $P=[\omega_{3000}/\omega_{30}]$.

<Dynamic viscoelastometry>

For dynamic viscoelastometry, used is Rheometric Scientific FE's ARES. Briefly, a polymer sample sheet of 1 mm thick formed by the use of a press-molding machine is sandwiched between a cone and a disc in the device, and heated up to 300° C. to have a strain of 20%, and the storage elastic modulus of the sample sheet is measured with varying the angular frequency $\omega$ (rad/sec) of the sample sheet. On the curve indicating the relationship between $\omega$ and the storage elastic modulus G' of the sample sheet thus measured, $\omega_{3000}$ and $\omega_{30}$ are read, from which is obtained the ratio P. In case where the sample sheet could not be measured within the range up to 300° C., it may be measured at different temperatures to prepare a master curve at 300° C. according to the temperature-time conversion rule. On the master curve thus prepared, the data may be read to obtain the intended ratio P.

P indicates the degree of elastic modulus change to shear rate change, and a smaller value of P indicates that the elastic modulus change to shear rate change of the polymer is smaller. P of the styrenic polymer of the invention must be at least 25 in order that the polymer retains good melt flowability and has improved moldability and melt tension. Preferably, it is at least 30, more preferably at least 35. If P of the polymer is smaller than 25, the elastic modulus change thereof is large and the moldability thereof lowers.

In addition to the above-mentioned requirement, it is desirable that the styrenic polymer of the invention satisfies the following (1) and (2):

(1) The ratio of the weight-average molecular weight (Mw) to the number-average molecular weight (Mn) of the polymer measured through GPC, Mw/Mn, is at most 5, preferably falling between 2.3 and 4.5, more preferably between 2.5 and 4.0;

(2) The ratio of the Z-average molecular weight (Mz) to Mn of the polymer measured through GPC, Mz/Mn, is at least 3.5, preferably at least 5.0, more preferably at least 6.0.

The polymer satisfying these (1) and (2) is favorable as its improved moldability is well balanced with the physical properties of the moldings of the polymer.

If Mw/Mn is over 5, the polymer will contain a large quantity of low-molecular-weight components, and the strength of its moldings will be low. If Mz/Mn is smaller than 3.5, the melt tension of the polymer will be low and the moldability thereof could not be improved.

More preferably, the styrenic polymer of the invention satisfies, in addition to the above-mentioned requirements, the following (1), (2) and (3) for its molecular weight distribution measured through GPC:

(1) The proportion of the component having a molecular weight of at most 50,000 of the polymer, $C_{50}$, falls between 1 and 30% by weight, more preferably between 4 and 20% by weight;

(2) The proportion of the component having a molecular weight of at least 1,000,000 of the polymer, $C_{1000}$, falls between 1 and 30% by weight, more preferably between 4 and 25% by weight, even more preferably between 6 and 20% by weight;

(3) The weight-average molecular weight, Mw, of the polymer falls between 100,000 and 2,000,000, more preferably between 150,000 and 800,000, even more preferably between 200,000 and 600,000.

The styrenic polymer of the invention additionally satisfying these requirements has a reduced quantity of low-molecular-weight components and has a relatively increased quantity of high-molecular-weight components, and therefore its melt tension is improved and its moldability is thereby improved. In addition, the mechanical strength of the polymer is also improved.

If the proportion of the component having a molecular weight of at most 50,000 of the polymer, $C_{50}$, is smaller than 1% by weight, the flowability of the polymer will be low; but if larger than 30% by weight, the melt tension of the polymer will be low. If the proportion of the component having a molecular weight of at least 1,000,000 of the polymer, $C_{1000}$, is smaller than 1% by weight, the melt tension of the polymer will be low; but if larger than 30% by weight, the flowability of the polymer will be low. If Mw of the polymer is smaller than 100,000, the mechanical strength of the polymer moldings will be low; but if larger than 1,000,000, the polymer viscosity will increase and the flowability of the polymer will lower.

Even more preferably, the proportion of the component having a molecular weight of at most 50,000, $C_{50}$, and the weight-average molecular weight, Mw, of the styrenic copolymer of the invention satisfy the following requirement:

$$\log(C_{50}) \geq -1.48 \times \log(Mw/1000)+4.44.$$

In GPC herein, a Toso's GPC column, GMHHR-H(S)HT is used, for which the eluent is 1,2,4-trichlorobenzene, and the temperature of the polymer sample to be measured is 145° C.

In addition to the above-mentioned requirements, it is further desirable that the styrenic polymer of the invention satisfies the following (1):

(1) When 2 g of a dry sample of the polymer is dissolved in 12 ml of 1,2,4-trichlorobenzene at 170° C., it gives no insoluble component. The presence or absence of the component insoluble in the solvent is checked through macroscopic observation of the polymer solution.

Satisfying the above-mentioned requirements, the melt tension of the styrenic polymer of the invention is improved, and the melt tension, MT, and the melt index, MI, of the polymer satisfy the following formula (2):

$$\log(MT) \geq -0.887 \times \log(MI)+0.654 \qquad (2).$$

The polymer satisfying the formula (2) means that its flowability in melt is better than that of conventional SPS and that its melt tension is higher than that of conventional SPS.

MT and MI of the polymer are measured according to the methods mentioned below.

<Method for MI measurement>

According to JIS-K7210, MI (g/10 min) of the polymer is measured under a load of 1.2 kg and at a temperature of 300° C.

<Method for MT measurement>

Used is a Toyo Seiki's capillograph. Briefly, a polymer sample is extruded at 290° C. through a die of 40 L×2.095

Φ (mm), and its MT (unit: g) is measured. The extrusion speed is 10 mm/min; and the take-up speed is 16.0 m/min. MT of the sample measured under the condition is referred to as $MT_{100}$ (g). In case where its $MT_{100}$ could not be measured because the sample being extruded is broken or cut, the take-up speed is gradually lowered and MT of the sample is measured at the lowered take-up speed.

In formula (2), MT is generally $MT_{100}$ (g), but it may be MT measured at such a lowered take-up speed.

Next described is a method for producing the styrenic polymer of the invention.

The method for producing the styrenic polymer of the invention is not specifically defined. For example, for producing it, at least two types of SPSs that differ in the molecular weight may be mixed. Concretely, one method for producing it comprises mixing SPS having a low molecular weight and SPS having a high molecular weight. For the weight-average molecular weight (Mw) of the constituent SPSs of the styrenic polymer of the invention, it is desirable that the ratio of the weight-average molecular weight $Mw_{HM}$ of the high-molecular-weight SPS to the weight-average molecular weight $Mw_{LM}$ of the low-molecular-weight SPS, $Mw_{HM}/Mw_{LM} \geq 3$. If the ratio is smaller than 3, the melt tension of the polymer may be low.

It is also desirable that the molecular weight distribution (Mw/Mn) of the low-molecular-weight SPS and the molecular weight distribution (Mw/Mn) of the high-molecular-weight SPS each fall between 1.5 and 2.5.

$MW_{LM}$ may be at least 100,000, but preferably at least 140,000. If $Mw_{LM}$ is smaller than 100,000, the low-molecular-weight component of the polymer will increase, and the mechanical strength of the polymer moldings will be low.

The method of mixing at least two SPSs that differ in the molecular weight is not specifically defined. For example, such SPSs may be dissolved and mixed in a solvent; or they may be kneaded in an extruder.

The method for preparing each SPS is not also specifically defined. For example, an aromatic vinyl monomer may be polymerized in the presence of a catalyst that comprises a transition metal compound and an organoaluminium compound. For producing such styrenic polymers having a syndiotactic structure, employable is any known method. For example, one method for them comprises polymerizing a styrenic monomer (this corresponds to the styrenic polymer to be produced), in the presence of a catalyst that comprises a titanium compound, a type of a transition metal compound, and a condensation product of water and a trialkylaluminium, a type of an organoaluminium compound, in or not in an inert hydrocarbon solvent (Japanese Patent Laid-Open No. 187708/1987, etc.). Poly (halogenoalkylstyrenes) and their hydrogenated polymers may also be produced in known methods. For example, for them, usable are the methods described in Japanese Patent Laid-Open Nos. 46912/1989 and 178505/1989.

The aromatic vinyl monomer to be used includes styrene and substituted styrenes such as methylstyrene, ethylstyrene, isopropylstyrene, tert-butylstyrene, phenylstyrene, vinylstyrene, vinylnaphthalene, chlorostyrene, bromostyrene, fluorostyrene, chloromethylstyrene, methoxystyrene, ethoxystyrene, butoxystyrene, etc. One or more of these may be homopolymerized or copolymerized.

The aromatic vinyl monomer may be copolymerized with any other comonomer except it. The comonomer includes, for example, olefinic monomers such as ethylene, propylene, butene, hexene, octene, etc.; dienic monomers such as butadiene, isoprene, etc.; cyclic olefin monomers, cyclic diene monomers, polar vinyl monomers, etc.

2 Moldings

The moldings of the invention are obtained by molding the styrenic polymer [1] mentioned above. The moldings of the invention comprise the above-mentioned specific styrenic polymer [1], and have the advantage of good moldability into sheets. Concretely, the neck-in defined by "die width-sheet width" is small in casting the polymer into sheets.

The shape of the moldings of the invention is not specifically defined, including, for example, sheets, films, containers, injection moldings, blow moldings, expansion moldings, etc. The styrenic polymer of the invention is especially favorable to films, stretched films, expanded sheets.

The molding method for the polymer is not specifically defined. For example, the styrenic polymer of the invention or its composition containing an antioxidant and an inorganic or organic filler is molded. In molding it, the polymer or its composition is melted under heat and extruded to give moldings of a predetermined shape. For films and sheets, the polymer melt is extruded or inflated in a mode of T-die extrusion or inflation; and for containers and other structures, the polymer melt is molded in a mode of injection molding. The extruder to be used may be any of a single-screw extruder or a double-screw extruder, and it may be or may not be vented. The extrusion condition is not specifically defined, and may be determined in any desired manner. Preferably, however, the temperature of the polymer melt falls between the melting point of the polymer and a temperature higher by 50° C. than the decomposition point of the polymer; and the shear stress thereto is at most $5 \times 10^6$ dyne/cm$^2$. After having been thus extruded, the resulting moldings are preferably cooled and solidified. The coolant in this step maybe any of vapor, liquid, metal, etc. In case where a metal roll is used in molding the polymer into sheets, employable is any method of using an air knife, an air chamber, a touch roll, an electrostatic charging unit or the like. The temperature at which the moldings are cooled and solidified may fall between 0° C. and a temperature higher by 30°C. than the glass transition point of the polymer, preferably between a temperature lower by 70° C. than the glass transition point and the glass transition point. The cooling rate is not specifically defined, and may fall between 200 and 3° C./sec, but preferably between 200 and 10° C./sec. The extruder to be used may be equipped with a suitable filter.

The moldings of the invention may be heat-treated at a temperature falling between the glass transition point of the polymer and 200° C., preferably between 140 and 180° C., more preferably between 150 and 170° C.

In case where the sheets are stretched, they may be biaxially stretched both at a time in the machine direction and in the cross direction, or may be stretched separately in the two directions in any desired order. Stretching them may be effected in one stage or in multiple stages. The draw ratio is not specifically defined and may be any desired one. For example, it may be at least two times in terms of the area ratio, preferably at least three times. For stretching them, employable are various methods of tenter stretching, roll-to-roll stretching, vapor pressure bubbling, rolling, etc. The temperature at which the sheets are stretched may fall between the glass transition point and the melting point of the polymer. The stretch rate may fall between $1 \times 10$ and $1 \times 10^5$ %/min. If desired, the stretched moldings may be heat-set at a temperature falling between the glass transition point and the melting point of the polymer.

The moldings of the styrenic polymer of the invention have improved mechanical strength.

When the polymer is mixed with a foaming agent and foamed under heat, it gives foamed moldings. For obtaining such foamed moldings, employable are known methods such as those described in Japanese Patent Laid-Open Nos. 120110/1996 and 248438/1990. Even when foamed to a large extent, the foamed moldings of the styrenic polymer of the invention can have a high percentage of closed cells.

The moldings of the invention are obtained by molding the styrenic polymer mentioned above. Not interfering with the object of the invention, the styrenic polymer may contain any of ordinary thermoplastic resins, rubber-like elastomers, antioxidants, inorganic fillers, nucleating agents, crosslinking agents, crosslinking promoters, plasticizers, compatibilizers, colorants, antistatic agents and others, and the resulting polymer composition may be used to form the polymer moldings.

The thermoplastic resins include styrenic polymers such as atactic polystyrenes, isotactic polystyrenes, AS resins, ABS resins, etc.; polyesters such as PET, etc.; polyethers such as PC, polyphenylene oxides (PPO), polysulfones, polyethersulfones, etc.; condensed polymers such as polyamides, PPS, polyoxymethylenes, etc.; acrylic polymers such as polyacrylic acids, polyacrylates, polymethyl methacrylates, etc.; polyolefins such as polyethylenes, polypropylenes, polybutenes, etc.; halogen-containing vinyl compound polymers such as polyvinyl chlorides, polyvinylidene chlorides, etc.; and their mixtures. Preferred are elastomers (rubbers) having rubber elasticity at room temperature. For example, they include styrenic compound-containing rubbers such as hydrogenated styrene-butadiene block copolymers (SEB), styrene-butadiene-styrene block copolymers (SBS), hydrogenated styrene-butadiene-styrene block copolymers (SEBS), styrene-isoprene block copolymers (SIR), hydrogenated styrene-isoprene block copolymers (SEP), styrene-isoprene-styrene block copolymers (SIS), hydrogenated styrene-isoprene-styrene block copolymers (SEPS), styrene-butadiene random copolymers (SBR), ABS rubbers, etc.; as well as natural rubbers, polybutadienes, polyisoprenes, polyisobutylenes, neoprenes, acrylic rubbers, urethane rubbers, silicone rubbers, polyether-ester rubbers, polyester-ester rubbers, olefinic rubbers (elastomers), concretely, copolymer rubbers of ethylene with any of a-olefins, aromatic vinyl compounds, dienes and others such as ethylene-propylene copolymer rubbers, ethylene-propylene-diene copolymer rubbers, ethylene-butene copolymer rubbers, ethylene-hexene copolymer rubbers, ethylene-octene copolymer rubbers, ethylene-styrene copolymer rubbers, etc.; and also their mixtures.

The above-mentioned rubbers may be modified with a polar group-having modifier, and the resulting modified rubbers may also be used herein. Their examples are maleic anhydride-modified rubbers, epoxy-modified rubbers, etc.

Various types of antioxidants are usable herein. Especially preferred are phosphorus-containing antioxidants, for example, monophosphites and diphosphites such as tris(2, 4-di-t-butylphenyl) phosphite, tris- (mono- and di-nonylphenyl) phosphites, etc.; and phenolic antioxidants. In addition to these, also usable herein are amine-type antioxidants, sulfur-containing antioxidants, etc. These may be used either singly or as combined. The amount of the antioxidant to be in the polymer composition may fall between 0.0001 and 1 part by weight.

The inorganic fillers may be in any form of fibers, granules and powders, including, for example, talc, mica, carbon black, titanium dioxide, silica, calcium carbonate, alumina, metal powder, etc.

The invention is described in more detail with reference to the following Examples, which, however, are not intended to restrict the scope of the invention.

The resin characteristics of the samples produced in these Examples are measured according to the methods described hereinabove.

PRODUCTION EXAMPLE 1

Preparation of Catalyst

Along with toluene, 3.8 mmols of triisobutylaluminium, 16.8 mmols of methylaluminoxane and 0.15 mmols of octahydrofluorenyltitanium trimethoxide were put into a container that had been fully dried and purged with nitrogen, and mixed to prepare a catalyst having a Ti content of 3 mmols/liter. After having been thus mixed, these components were stirred for 1 hour, and the resulting catalyst is used in the following Examples.

PRODUCTION EXAMPLE 2

Preparation of Catalyst

Along with toluene, 3.8 mmols of triisobutylaluminium, 11.3 mmols of methylaluminoxane and 0.15 mmols of pentamethylcyclopentadienyltitanium trimethoxide were put into a container that had been fully dried and purged with nitrogen, and mixed to prepare a catalyst having a Ti content of 3 mmols/liter. After having been thus mixed, these components were stirred for 1 hour, and the resulting catalyst is used in the following Examples.

PRODUCTION EXAMPLE 3

Production of SPS 5 liters of styrene and triethylaluminium in a molar ratio, styrene/triethylaluminium=3500/1 were put into a reactor that had been fully dried and purged with nitrogen, and well stirred. The mixture of styrene and triethylaluminium was heated up to 85° C., and then 21 ml of the catalyst prepared in Production Example 1 was added thereto. With that, the monomer started to polymerize. After 1 hour, methanol was added to the system to stop the polymerization. The resulting polymer was washed with methanol, and then dried at 200° C. for 2 hours. Its yield was 1130 g. The weight-average molecular weight of the polymer was 153,000.

PRODUCTION EXAMPLE 4

Production of SPS

A polymer was produced in the same manner as in Production Example 3, except that 4.4 liters of styrene and 0.6 liters of paramethylstyrene were used in place of 5 liters of styrene. Its yield was 1170 g; and the weight-average molecular weight of the polymer was 163,000.

PRODUCTION EXAMPLE 5

Production of SPS

A polymer was produced in the same manner as in Production Example 4, except that the polymerization temperature was varied to 78° C. Its yield was 1210 g; and the weight-average molecular weight of the polymer was 212,000.

PRODUCTION EXAMPLE 6

Production of SPS

A polymer was produced in the same manner as in Production Example 4, except that the polymerization temperature was varied to 80° C. and that triethylaluminium was not added to the system. Its yield was 1120 g; and the weight-average molecular weight of the polymer was 304,000.

PRODUCTION EXAMPLE 7

Production of SPS

A polymer was produced in the same manner as in Production Example 4, except that the polymerization temperature was varied to 63° C. and that triethylaluminium was not added to the system. Its yield was 1250 g; and the weight-average molecular weight of the polymer was 610,000.

PRODUCTION EXAMPLE 8

Production of SPS 4.4 liters of styrene and 0.6 liters of paramethylstyrene were put into a reactor that had been fully dried and purged with nitrogen, and triethylaluminium in a molar ratio, styrene/triethylaluminium=7000/1 was added thereto and well stirred. The mixture was heated up to 70° C., and 42 ml of the catalyst prepared in Production Example 2 was added thereto. With that, the monomers started to polymerize. After 1 hour, methanol was added to the system to stop the polymerization. The resulting polymer was washed with methanol, and then dried at 200° C. for 2 hours. Its yield was 1230 g. The weight-average molecular weight of the polymer was 1,030,000.

PRODUCTION EXAMPLE 9

Production of SPS

A polymer was produced in the same manner as in Production Example 8, except that the polymerization temperature was varied to 50° C. and that triethylaluminium was not added to the system. Its yield was 1105 g; and the weight-average molecular weight of the polymer was 2,500,000.

PRODUCTION EXAMPLE 10

Production of SPS

A polymer was produced in the same manner as in Production Example 9, except that 5 liters of styrene was used in place of 4.4 liters of styrene and 0.6 liters of paramethylstyrene. Its yield was 1100 g; and the weight-average molecular weight of the polymer was 2,530,000.

Of the polymers obtained in Production Examples 3 to 10, the molecular weight distribution (Mw/Mn) of the low-molecular-weight SPSs (Production Examples 3 to 6) and the molecular weight distribution (Mw/Mn) of the high-molecular weight SPSs (Production Examples 7 to 10) are shown below.

| Number of Production Examples | Mw/Mn |
|---|---|
| 3 | 1.9 |
| 4 | 1.9 |
| 5 | 1.9 |
| 6 | 2.1 |
| 7 | 1.9 |
| 8 | 2.1 |
| 9 | 2.3 |
| 10 | 2.3 |

EXAMPLE 1

The polymers of Production Example 5 and Production Example 8 were put into a 20-liter container in a ratio by weight of 80:20, totaling 1200 g, and 13 liters of paraxylene was added thereto. These were stirred at 150° C. for 1 hour and dissolved. The resulting solution was cooled, gelled, ground, then washed with methanol, and dried at 200° C. for 2 hours to obtain apolymer blend powder. The powder was pelletized at 300° C. through a Toyo Seiki's single-screw extruder, Laboplastomill. The resin characteristics of the resulting pellets were measured according to the methods mentioned above. The data obtained are given in table 1 and Table 2.

EXAMPLE 2

The same process as in Example 1 was repeated, except that the polymer of Production Example 4 and not the polymer of Production Example 5 was used and that the ratio by weight of the polymer of Production Example 4 to that of Production Example 8 was varied to 65:35. The data obtained herein are given in Table 1 and Table 2.

EXAMPLE 3

The polymers of Production Example 4 and Production Example 9 were blended in dry in a ratio by weight of 70:30, totaling 1000 g. The resulting mixture was pelletized at 300° C. through a Toyo Seiki's double-screw extruder, Laboplastomill. The resin characteristics of the resulting pellets were measured according to the methods mentioned above. The data obtained are given in Table 1 and Table 2.

EXAMPLE 4

The same process as in Example 3 was repeated, except that the polymers of Production Example 3 and Production Example 10 were blended in a ratio by weight of 85:15. The data obtained herein are given in Table 1 and Table 2.

COMPARATIVE EXAMPLE 1

The polymer of Production Example 6 was pelletized through a Toyo Seiki's single-screw extruder, Plastomill. The resin characteristics of the resulting pellets were measured according to the methods mentioned above. The data obtained are given in Table 1 and Table 2.

COMPARATIVE EXAMPLE 2

The polymer of Production Example 5 was pelletized through a Toyo Seiki's single-screw extruder, Plastomill. The resin characteristics of the resulting pellets were measured according to the methods mentioned above. The data obtained are given in Table 1 and Table 2.

COMPARATIVE EXAMPLE 3

The same process as in Example 1 was repeated, except that the polymers of Production Example 5 and Production Example 7 were blended in a ratio by weight of 90:10. The data obtained herein are given in Table 1 and Table 2.

EXAMPLE 5

Formation of Cast Sheet

The polymer of Example 2 was cast into a sheet under the molding condition mentioned below. The neck-in defined by "die width—sheet width" was measured. A smaller neck-in value indicates that the moldability of the polymer into sheets is better. The mean width of the sheet molded herein was 67 mm; and the neck-in was 83 mm.

Molding Machine: 20 mmΦ single-screw extruder, preset temperature=300° C.

Die: 150 mm width, lip aperture=1 mm.

Extrusion Rate: 6 kg/hr.

Roll Speed: 10 m/min.

COMPARATIVE EXAMPLE 4

Formation of Cast Sheet

The polymer of Comparative Example 1 was cast into a sheet in the same manner as in Example 5. The mean width of the sheet molded herein was 42 mm; and the neck-in was 108 mm.

What is claimed is:

1. A styrenic polymer having a syndiotactic structure, of which the ratio P of the angular frequency, $\omega_{3000}$ (unit: rad/sec), when its storage elastic modulus G' measured through dynamic viscoelastometry is 3000 (Pa), to the angular frequency thereof, $\omega_{30}$ (unit: rad/sec), when its storage elastic modulus G' is 30 (Pa), $P=[\omega_{3000}/\omega_{30}]$ satisfies the following formula (1):

$$P=[\omega_{3000}/\omega_{30}] \geq 25 \qquad (1).$$

2. The styrenic polymer as claimed in claim 1, which satisfies the following (1) and (2):
   (1) the ratio of the weight-average molecular weight (Mw) to the number-average molecular weight (Mn) of the polymer measured through gel permeation chromatography (GPC), Mw/Mn, is at most 5;
   (2) the ratio of the Z-average molecular weight (Mz) to Mn of the polymer measured through GPC, Mz/Mn, is at least 3.5.

3. The styrenic polymer as claimed in claim 1, of which the molecular weight distribution measured through GPC satisfies the following (1), (2) and (3):
   (1) the proportion of the component having a molecular weight of at most 50,000 of the polymer, $C_{50}$, falls between 1 and 30% by weight;
   (2) the proportion of the component having a molecular weight of at least 1,000,000 of the polymer, $C_{1000}$, falls between 1 and 30% by weight;

TABLE 1

|  | Example 1 | Example 2 | Example 3 | Example 4 | Comp. Ex. 1 | Comp. Ex. 2 | Comp. Ex. 3 |
|---|---|---|---|---|---|---|---|
| MI (g/10 min) | 4.4 | 2.7 | 5.1 | 10.5 | 3.1 | 10.6 | 5.2 |
| Mw/1000 | 343 | 454 | 327 | 274 | 300 | 206 | 274 |
| Mn/1000 | 132 | 123 | 109 | 940 | 145 | 108 | 125 |
| Mz/1000 | 990 | 1574 | 981 | 1025 | 522 | 335 | 600 |
| Mw/Mn | 2.6 | 3.7 | 3.0 | 2.9 | 2.1 | 1.9 | 2.2 |
| Mz/Mn | 7.5 | 12.8 | 9.0 | 10.9 | 3.6 | 3.1 | 4.8 |
| $Mw_{HM}/Mn_{LM}$ | 4.9 | 6.3 | 15.3 | 16.5 | — | — | 2.9 |
| $C_{50}$ (wt. %) | 6.4 | 8.5 | 9.8 | 5.5 | 4.7 | 8.5 | 6.9 |
| $C_{1000}$ (wt. %) | 6.8 | 12.4 | 7.4 | 12.2 | 2.6 | 0.3 | 3.1 |
| $\omega_{30}$ (rad/sec) | 0.159 | 0.127 | 0.223 | 0.335 | 0.423 | 1.49 | 0.445 |
| $\omega_{3000}$ (rad/sec) | 5.95 | 3.98 | 10.0 | 17.9 | 7.72 | 25.7 | 10.7 |
| P | 37.7 | 31.3 | 44.8 | 53.4 | 18.3 | 17.2 | 24.0 |
| Insoluble Component | no | no | no | no | no | no | no |

TABLE 2

|  | Example 1 | Example 2 | Example 3 | Example 4 | Comp. Ex. 1 | Comp. Ex. 2 | Comp. Ex. 3 |
|---|---|---|---|---|---|---|---|
| Right Side of Formula (2) | 0.083 | 0.27 | 0.026 | −0.25 | 0.22 | −0.26 | 0.019 |
| MT (g) | 3.4 | 3.4 | 2.0 | 0.8 | 1.6 | 0.4 | 0.9 |
| Left Side of Formula (2) | 0.53 | 0.53 | 0.30 | −0.097 | 0.20 | −0.40 | −0.046 |
| Take-up Speed (m/min) | 6.4 | 6.4 | 16.0 | 16.0 | 16.0 | 16.0 | 16.0 |
| Formula (2)* | ○ | ○ | ○ | ○ | x | x | x |

Formula (2)*: ○ satisfied; x not satisfied.

INDUSTRIAL APPLICABILITY

SPS of the invention has good workability for expansion molding, blow molding, inflation molding, etc., and gives moldings having excellent mechanical strength and solvent resistance. It is favorable to sheets and films for wrapping and packaging edibles, to containers, and also to foamed materials for buildings, automobile parts, containers for edibles, etc.

(3) the weight-average molecular weight, Mw, of the polymer falls between 100,000 and 2,000,000.

4. The styrenic polymer as claimed in claim 3, of which the proportion of the component having a molecular weight of at most 50,000, $C_{50}$, and the weight-average molecular weight, Mw, satisfy the following:

$$\log(C_{50}) \geq -1.48 \times \log(Mw/1000)+4.44.$$

5. The styrenic polymer as claimed in claim 1, of which the melt tension, MT, and the melt index, MI, satisfy the following formula (2):

$$\log(MT) \geqq -0.887 \times \log(MI) + 0.654 \qquad (2).$$

6. A molded article comprising the styrenic polymer claimed in claim 1.

7. A molded article comprising the styrenic polymer claimed in claim 2.

8. A molded article comprising the styrenic polymer claimed in claim 3.

9. A molded article comprising the styrenic polymer claimed in claim 4.

10. A molded article comprising the styrenic polymer claimed in claim 5.

\* \* \* \* \*